United States Patent [19]

Satz

[11] Patent Number: 4,846,366
[45] Date of Patent: Jul. 11, 1989

[54] CONTAINER AND CLOSURE

[76] Inventor: William Satz, 339 N. Oakhurst, Beverly Hills, Calif. 90210

[21] Appl. No.: 185,696

[22] Filed: Apr. 25, 1988

Related U.S. Application Data

[63] Continuation-in-part of Ser. No. 6,251, Jan. 12, 1987, abandoned, and a continuation-in-part of Ser. No. 878,410, Jun. 21, 1986, abandoned, and a continuation-in-part of Ser. No. 799,274, Nov. 18, 1985, abandoned, and a continuation-in-part of Ser. No. 721,491, Apr. 9, 1985, abandoned, and a continuation-in-part of Ser. No. 605,975, Apr. 30, 1984, abandoned, which is a continuation-in-part of Ser. No. 543,785, Oct. 20, 1983, abandoned, which is a continuation-in-part of Ser. No. 389,235, Jun. 17, 1982, abandoned, which is a continuation-in-part of Ser. No. 287,550, Jul. 28, 1981, abandoned, which is a continuation-in-part of Ser. No. 117,044, Jan. 31, 1980, abandoned, which is a continuation-in-part of Ser. No. 1,402, Jan. 8, 1979, abandoned, which is a continuation-in-part of Ser. No. 886,273, Jan. 3, 1978, abandoned.

[51] Int. Cl.$^4$ ............................................. B65D 43/10
[52] U.S. Cl. .................................... 220/355; 220/308; 220/356
[58] Field of Search ................... 220/355, 356, 308, 74

[56] References Cited

U.S. PATENT DOCUMENTS

| | | | |
|---|---|---|---|
| 1,009,654 | 11/1911 | Ducker | 220/355 |
| 2,060,504 | 11/1936 | Kjellstrom | 220/356 |
| 2,141,184 | 12/1938 | Hothersall | 220/355 |
| 2,142,743 | 1/1939 | Calleson et al. | 220/308 |
| 3,333,728 | 8/1967 | Burdick, Jr. | 220/308 |
| 3,391,821 | 7/1968 | Satz | 220/308 |
| 3,410,448 | 11/1968 | Hudson | 220/356 |
| 3,770,161 | 11/1973 | Knize | 220/355 |
| 3,805,993 | 4/1974 | Enzie et al. | 220/308 |

FOREIGN PATENT DOCUMENTS

| | | | |
|---|---|---|---|
| 46582 | 12/1932 | Denmark | 220/355 |
| 393024 | 6/1933 | United Kingdom | 220/42 |
| 460774 | 2/1937 | United Kingdom | 220/308 |
| 1159199 | 7/1969 | United Kingdom | 220/308 |

Primary Examiner—Steven M. Pollard
Attorney, Agent, or Firm—Beehler, Pavitt, Siegemund, Jagger, Martella & Dawes

[57] ABSTRACT

A container and closure therefor adapted for initial commercial use and of such character that it can be repeatedly resealed by the ultimate purchaser features a specially formed rim on the edge of the container and a closure having an annular recess which fits over both the outside and inside edge of the specially formed rim. The rim is turned to form a bead spaced from the edge and there is a complementary bead on the closure spaced from the first bead when the closure is in place to facilitate dislodging the closure when the container is to be opened.

12 Claims, 5 Drawing Sheets

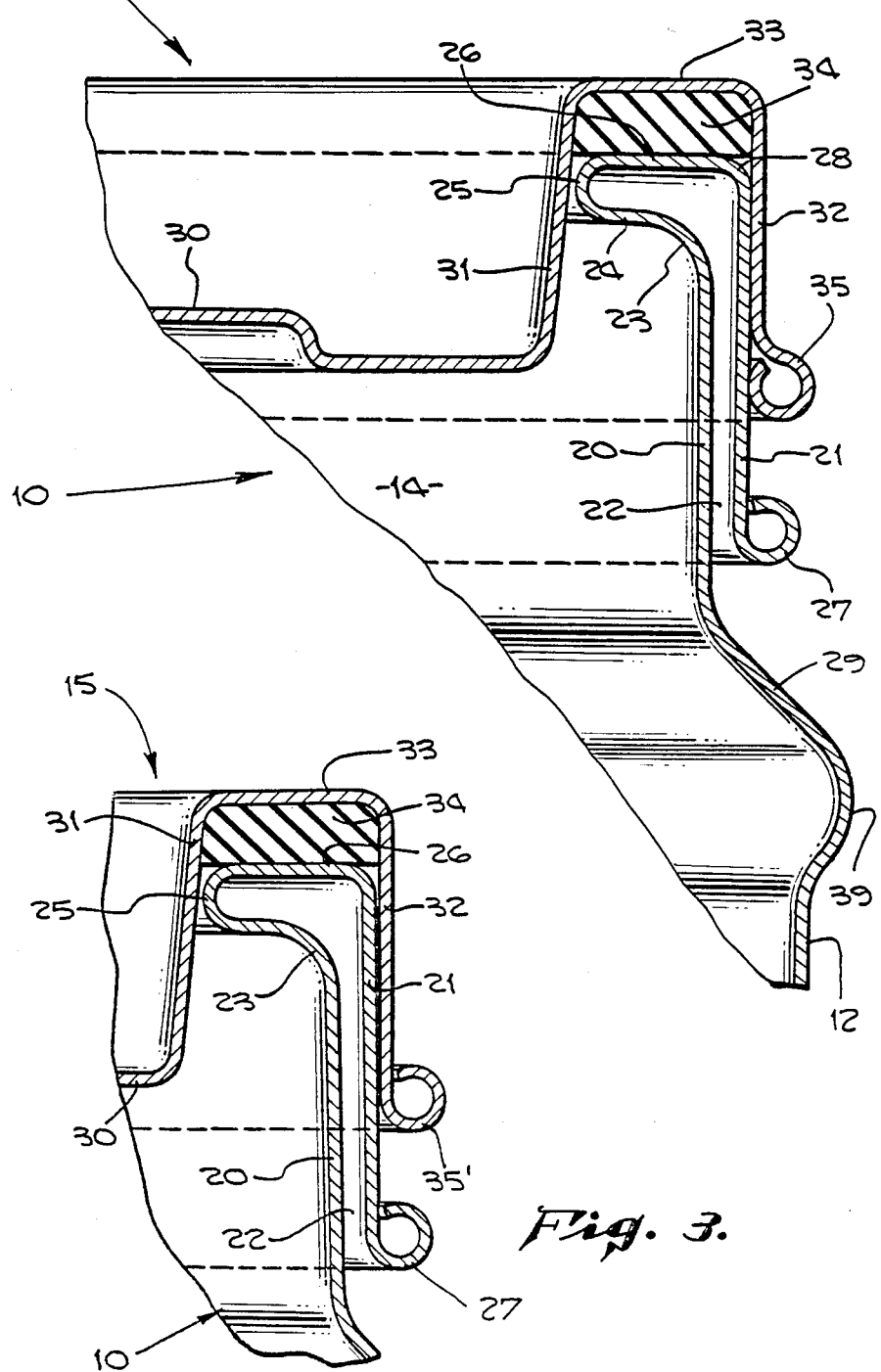

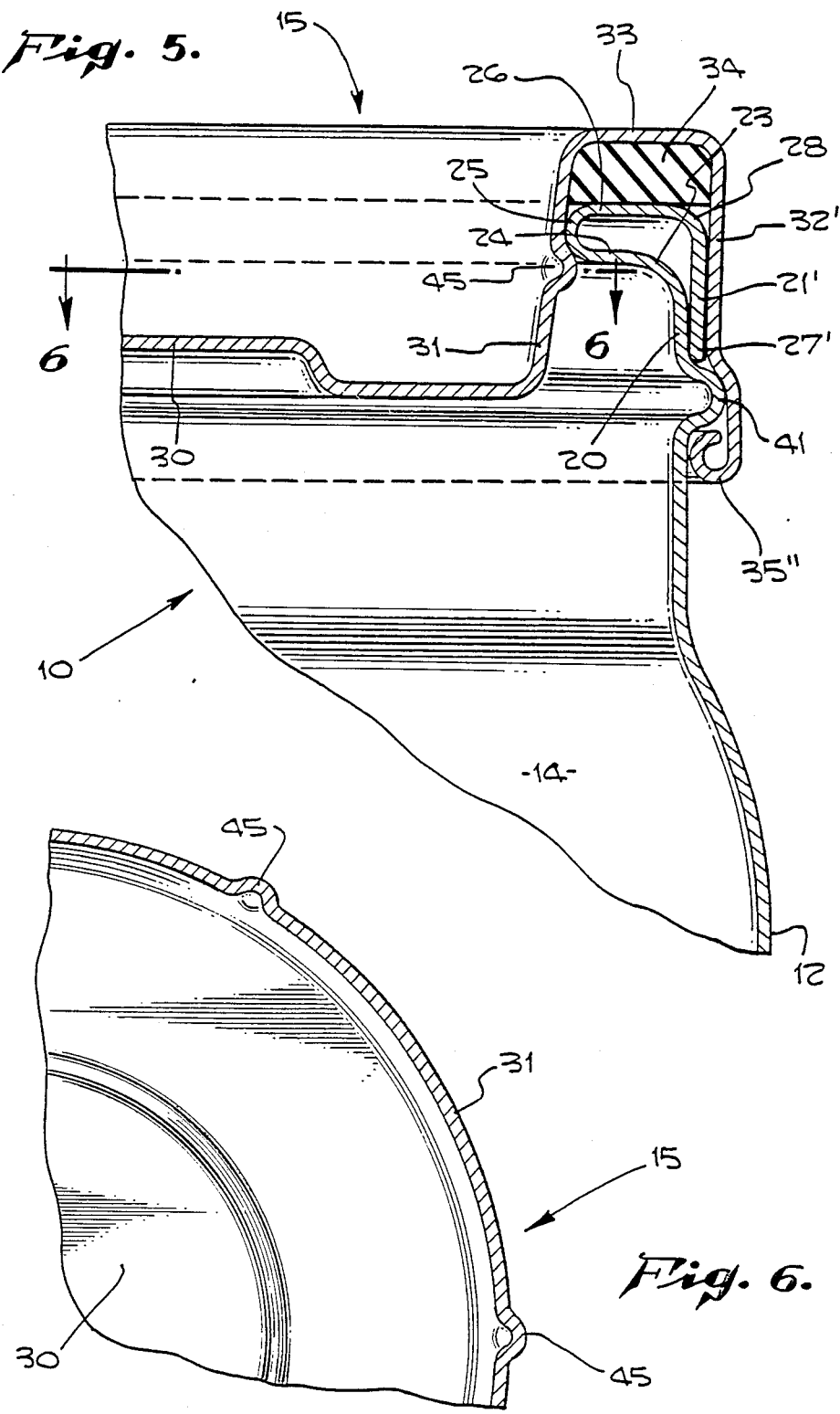

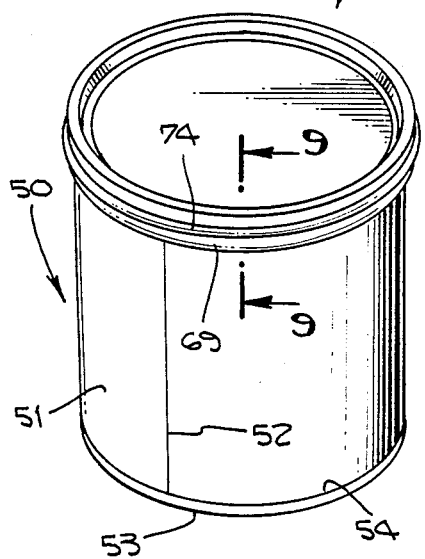
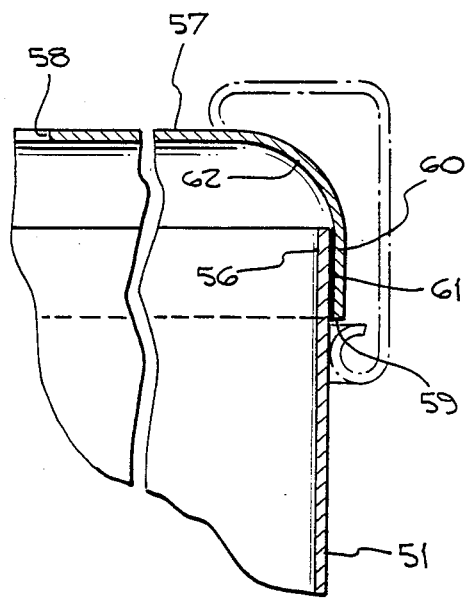
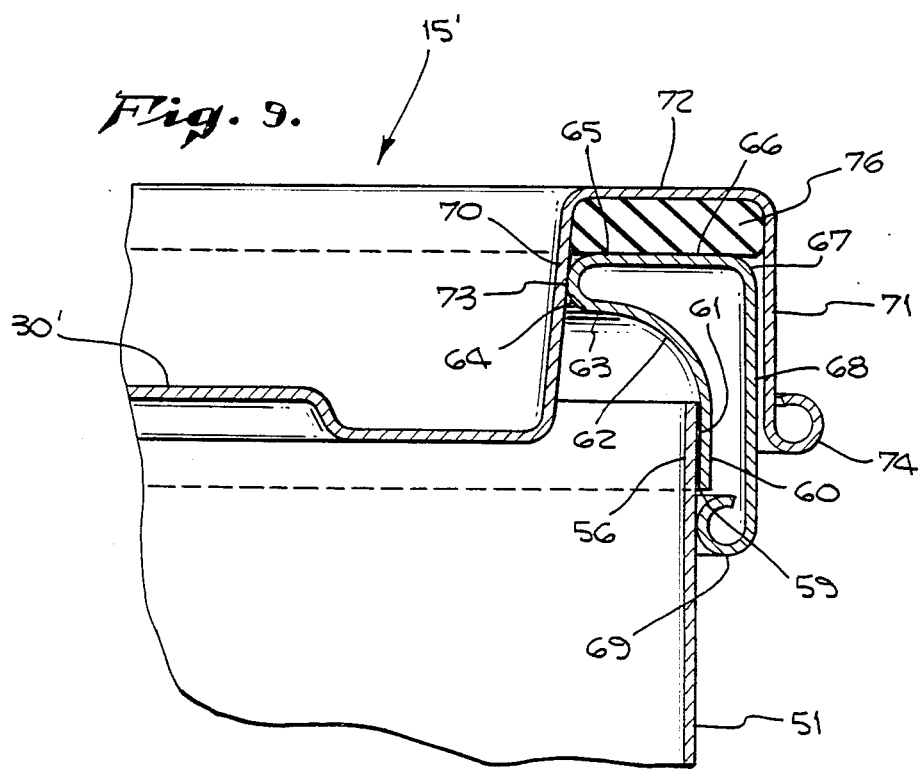

CONTAINER AND CLOSURE

This is a continuation-in-part application of file wrapper continuations of Ser. No. 006,251, filed Jan. 12, 1987 now abandoned; of Ser. No. 878,410, filed June 21, 1986, now abandoned; of Ser. No. 799,274, filed Nov. 18, 1985, now abandoned; of Ser. No. 721,491, filed Apr. 9, 1985, now abandoned; of Ser. No. 605,975, filed Apr. 30, 1984, now abandoned, of Ser. No. 543,785, filed Oct. 20, 1983, now abandoned, which is a continuation of Ser. No. 389,235, filed June 17, 1982, now abandoned, which is a continuation in part of Ser. No. 287,550, filed July 28, 1981, now abandoned, which is a continuation of Ser. No. 117,044, filed Jan. 31, 1980, now abandoned, which is a continuation in part of Ser. No. 001,402, filed Jan. 8, 1979, now abandoned, which is a continuation of Ser. No. 886,273, filed Jan. 3, 1978, now abandoned.

There has long been a problem in the design and manufacturing of containers and closures capable of being applied commercially in a tight enough condition to assure that the seal will remain unbroken despite the character of the contents and which once removed and the contents partially used is capable of being effectively resealed on repeated occasions. Typical of containers of the kind experiencing such difficulties are paint cans.

For many decades the accepted construction for a paint can is one wherein an inwardly extending lip is provided with an annular groove open at the top for reception of a lid having a complementary annular projection which is jammed into the groove tightly enough to hold heavy liquid contents which is typical of paint until the can of paint can be sold. The closure and seal thus initially provided has been rugged enough for the purpose and provides a sealed can capable of suffering appreciable abuse until finally sold to the customer.

An almost insurmountable objection to typical paint cans resides in the fact that once they have been opened by the user and paint permitted to flow into the annular groove, the can can be resealed only with difficulty such, for example, as hammering the lid back into place as the can continues to be reopened for casual reuse. The accumulation of partially dried paint gets deeper and deeper in the groove until, and frequently long before the contents have been entirely used, it becomes almost impossible to effectively reapply the lid to make a tight joint. When the cover is reapplied it is rarely air-tight and air admitted causes a film to be formed at the surface of the paint in the can. Consequently a great deal of paint thickens and spoils in the can and is wasted.

Another difficulty with cans of the type described is the inability to pour the contents out of the can completely. Even though the can is tilted almost vertically upside down, there invariably remains an accumulation of contents under the inwardly extending lip and the only way to be sure of pouring out all the contents is to soak the residual up with a brush or scraper, little by little, until all but the remaining quantity adhering to the underside of the lip remains. Here again much of the contents is wasted and the problem of emptying a can is objectionally difficult.

Containers for other materials which are currently available also have limitations both with respect to initial sealing and subsequent resealing. Typical of such other materials is ground coffee where, to preserve freshness, it is highly desirable to have an initially tight seal but also a seal which can be effectively resealed on repeated occasions with a special degree of assurance so that the contents will remain fresh until they are finally entirely used. The plastic cover which is often supplied as an accessory is no more than a cover and does not reseal the container once the metal closure has been cut off. Containers for other types of foods where freshness is a requisite face comparable difficulties.

Clearly enough with present technology it is possible to make securely sealed containers capable of being resealed whether by use of screw tops or some other means. Despite such prospect, there is always a price consideration of such character that in many instances the cost of such an effective seal capable of repeated resealing is higher than the market can support. This accounts for continued employment of ineffective inexpensive seals such as those described even though better seals can be made.

It is therefore among the objects of the invention to provide a new and improved container and closure therefor which is relatively simple and inexpensive and which is capable of being initially commercially sealed and thereafter capable of repeated effective resealing.

Another object of the invention is to provide a new and improved container and closure therefor capable of being manufactured relatively inexpensively, which is rugged to the extent that it can be used for virtually any type of contents and which can be readily opened by simple means and subsequently resealed.

Still another object of the invention is to provide a new and improved container and closure therefor wherein an effective initial seal capable of repeated resealing is formed substantially from the material of the respective container and closure.

Still another object of the invention is to provide a new and improved container and closure therefor capable of reliable sealing and resealing wherein the container is of such character that the contents can be completely disposed of with relative ease.

Still another object of the invention is to provide a new and improved container and closure therefor which is inexpensive, which is capable of effective initial sealing and resealing, and which is sufficiently compact so that the sealed container occupies virtually a minimum amount of space for shipping.

Also among the further objects of the invention is to provide a new and improved container and closure therefor wherein material of the container and closure is formed to provide for the sealing and resealing and wherein by virtue of the construction of the individual parts an especially tight seal can be easily made either initially or subsequently, and wherein an expedient is incorporated to greatly facilitate removal of the closure without employment of a special tool.

With these and other objects in view, the invention consists in the construction, arrangement, and combination of the various parts of the device, whereby the objects contemplated are attained, as hereinafter set forth, pointed out in the appended claims and illustrated in the accompanying drawings.

In the drawings:

FIG. 2 is a fragmentary enlarged sectional view on the circular line 2—2 of FIG. 1.

FIG. 3 is a fragmentary enlarged sectional view of a partially modified form of the closure.

FIG. 5 is a fragmentary sectional view similar to FIG. 4, showing still another form of the closure.

FIG. 6 is a fragmentary cross-sectional view on the line 6—6 of FIG. 5.

FIG. 7 is a side perspective view of a different embodiment of the invention.

FIG. 8 is a vertical fragmentary sectional view showing an initial step in the formation of the embodiment of the invention of FIG. 7.

FIG. 9 is a vertical fragmentary sectional view similar to FIG. 8 but with the rim in final form and with the closure in place taken on the line 9—9 of FIG. 7.

Figure 1:
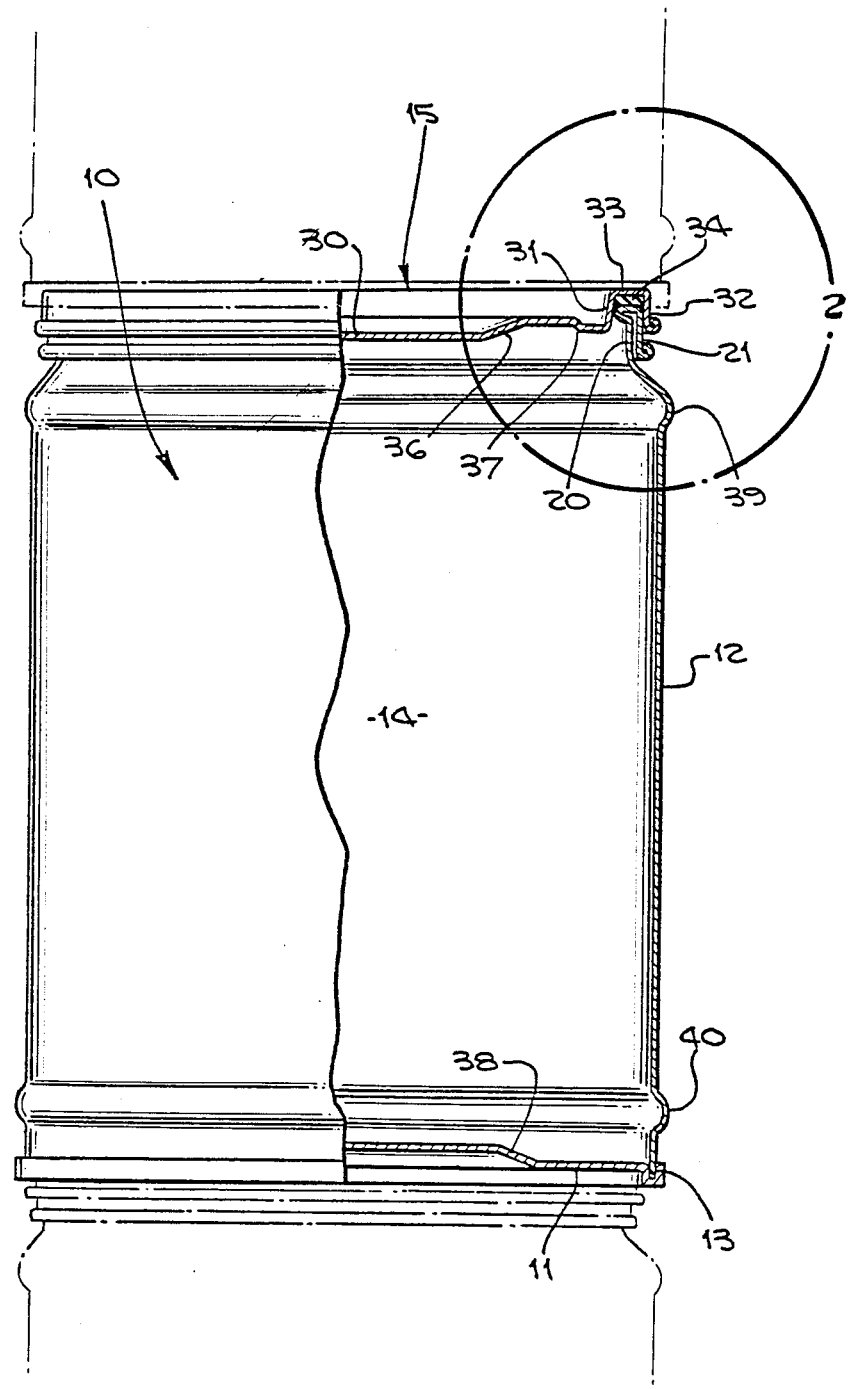
FIG. 1 is a side elevational view of the container and closure partially broken away to show the construction.

In an embodiment of the invention chosen for the purpose of illustration there is shown a container indicated generally by the reference character 10 which consists of a bottom wall 11 and a side wall 12. Although the bottom wall and side wall are shown as having a soldered joint 13 therebetween and where the side wall may have a seam, the container also may be a drawn body with the bottom wall and side wall of integral construction.

The container provides a chamber 14 for the contents and the chamber is closed by a lid or closure indicated generally by the reference character 15.

At the top of the side wall there is a somewhat composite rim. To form the rim there is provided an inner wall section 20 and an outer wall section 21 in parallel relationship and spaced a slight distance in the chosen embodiment one from the other providing a relatively narrow annular and somewhat variable space 22. The inner wall section extends throughout a curved portion 23 and inwardly directed lip 24 to a radially inwardly extending convex camming surface 25. The camming surface in the chosen embodiment extends for approximately 180 degrees terminating at the inner perimeter of a land 26. At the outer perimeter of the land 26 is a curved portion 28 where the land joins the outer wall section 21. The land 26 is relatively flat and non-deformable to the extent needed. As such it forms a rigid junction between the outer and inner wall sections when engaged by adjacent portions of the closure 15. At the lower edge of the outer wall section there is an outwardly turned bead 27. It is of some moment to note that the side wall 12 has an inwardly directed curved portion 29 extending inwardly to such an extent that the outer perimeter of the bead lies well within the outermost portion of side wall 12.

The closure 15, previously identified, consists of a cover plate 30 having at its outer perimeter an inner band 31 and an outer band 32. In the chosen embodiment it is the inner band 31 which is pitched slightly in an oblique direction so that at the point where the closure is in sealed position on the container the distance between the inner band and the outer band will be such as to snugly fit over the rim of the container with the inner band 31 pressed against the convex camming surface 25 and the outer band 32 in face to face engagement with the outside surface of the outer wall section 21.

Connecting the inner band and the outer band is a bottom wall 33 which together with the inner and outer bands forms a pocket for reception of a sealing material 34, for use whenever such a sealing material might be desired. For some contents the sealing material may be omitted.

At the free edge of the outer band 32 there is provided an inwardly turned bead 35 which is a bead formed from the same material as the outer band. In FIG. 3 a comparable bead 35' is turned outwardly. In other respects the modification of FIG. 3 is substantially like the form of invention of FIG. 2. It is of further consequence to note that the bead 35, or bead 35' as the case may be, extends virtually no further outwardly in a radial direction than the previously identified bead 27 so that both beads and, as a consequence, all portions of the closure reside at a location which extends no further outwardly than the outer perimeter of the side wall 12. The curved portion 28 of the container provides a surface over which the bead 35, or 35' can readily slide into sealing position.

The cover plate is dished at points 36 and 37 for added rigidity. The same is true of the bottom wall 11 which is dished at point 38. Moreover, in the construction shown the assembled containers and closures can be stacked as suggested by the broken lines of FIG. 1 inasmuch as the innermost portion of the soldered joint 13 has a diameter slightly larger than the outermost portion of the closure at the outer band 32. When stacked, the side walls 12 of respectively stacked containers are in alignment and the containers occupy no greater lateral space by reason of application of the closures than needed for the containers by themselves.

The land 26, previously described as non-deformable, incorporates a distinctive structure to give it the needed rigidity, taking into consideration the fact that the thickness of material of the land is nominally the same as the wall thickness of the container generally. At the inside edge the non-yielding camming surface extending through its arc of 180° provides rigidity to the marked degree. At the outside edge a comparable amount of rigidity is provided by the non-yielding curved portion 28, these curved portions 28 and 25 being, in a sense, back to back and facing in opposite directions. The result is substantial rigidity for the flat, horizontal land 26 which lies between them. The overall rigidity of the composite rim is further enhanced by the non-yielding structure of the annular curved portion 23.

Figure 4:
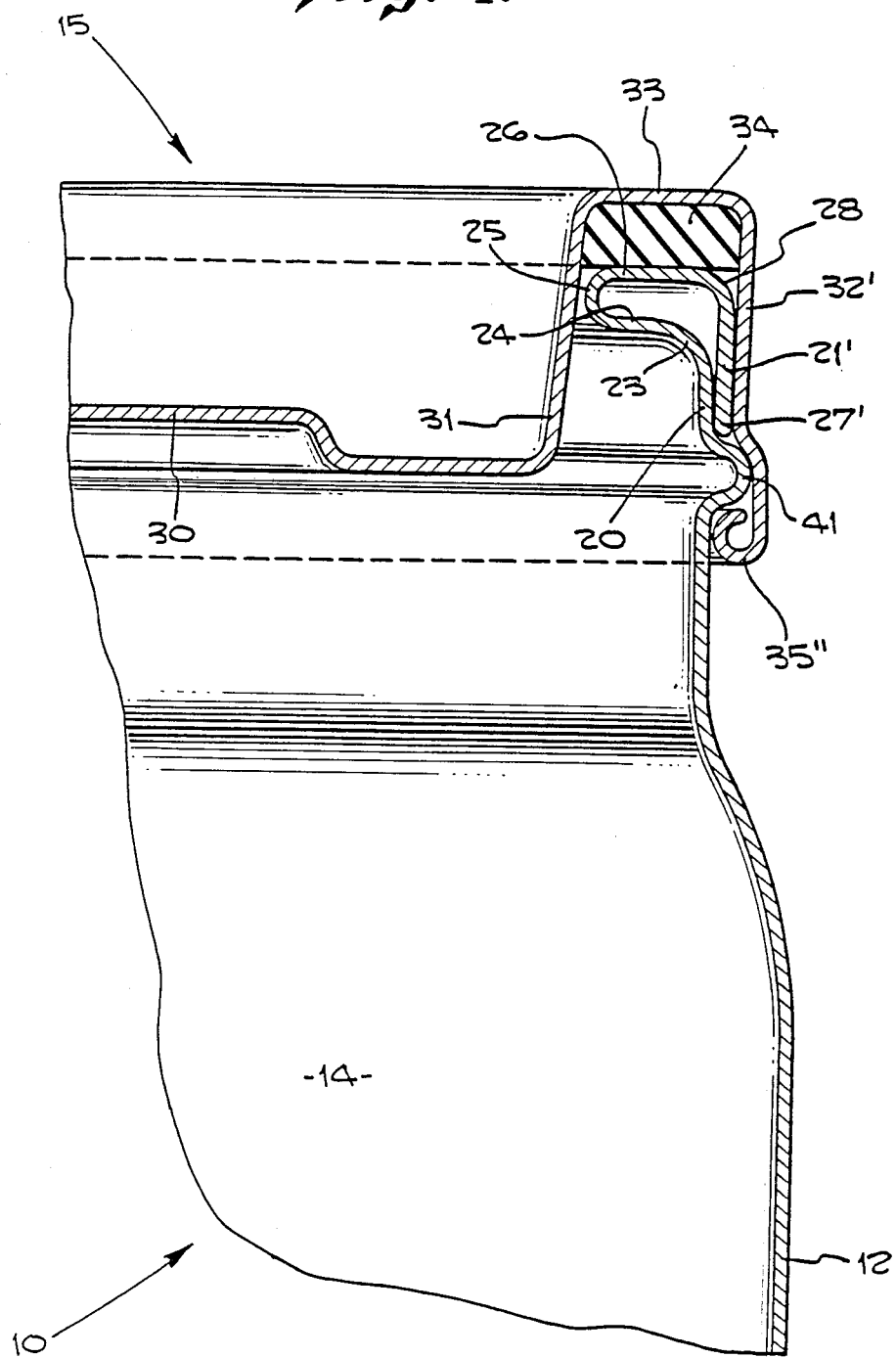
FIG. 4 is a fragmentary sectional view similar to FIG. 2 showing another form of the closure.

In the form of invention of FIG. 4, an outer wall section 21' terminates in a straight edge 27' instead of a bead 27 as in FIG. 2. On the wall section 20' is an annular outwardly extending stop 41 immediately adjacent the straight edge 27'.

An outer band 32' of the closure, overlying the outer wall section 21', terminates in an inwardly turned bead 35" adapted to underlie the stop 40 in closed position of the closure. By leaving the end edge of the outer wall section free, the outer wall section 21' like the outer wall section 21 of FIGS. 1, 2 and 3 is given a degree of yieldability which contributes materially to the sealability and removability of the closure.

In use the closure may be applied to the container by automatic means once the container has been filled with its contents. In application the inner and outer bands 31, 32 are pressed into the position of FIG. 2, or FIG. 3, if that be the case. Little or no deformation of either the closure or the container takes place because of the fact that the outer and inner bands are spaced so as to be applied snugly over the rim of the closure pressing against opposite sides of the rim, namely, against the camming surface 25 and the outer wall section 21 which are confined in that way between the inner and outer bands 31 and 32 of the closure.

When the closure is to be removed, a substantially conventional pry, such for example as the end of a screwdriver or a side of a knife blade, may be applied to the space between the beads 27 and 35 and the closure in this way pried upwardly from its position of sealing engagement. When the contents of the container have been used, or more frequently partially used, the closure can again be reapplied by hand and pressed into a sealed condition virtually the same as the initially sealed condition. There is no place on the rim of the container for accumulation of the contents of the container which would otherwise impair an effective reseal.

Should it be desired to completely empty the container of its contents after the closure has been removed, the contents flow readily around the curved portion 23 and there remains substantially no flat overlying portion preventing the complete discharge of the contents, the breadth of the lip 24 being virtually negligible.

As an additional safety factor, there are provided an upper annular bead 39 and a lower annular bead 40. The beads are designed to protrude far enough out beyond the surface of the side wall 12 to absorb impact, should a full can be dropped on its side, and minimize prospective damage to the sealing effect of the closure.

In the form of the invention of FIGS. 5 and 6, there is provided a series of outwardly directed projections 45 spaced circumferentially about the inner band 31. Six of the projections 45 may be depended upon for acceptable performance. It is of consequence to note that the projections are at a location inwardly from the level of the wall 33 such that they snap snugly under the camming surface 25. Although the projections 45 are shallow, the distribution and location is such as to provide an additional security for the closure on the container while at the same time permitting the closure to be readily reapplied for repeated effective resealings.

In the form of invention of FIGS. 7, 8 and 9 there is shown a metal container 50 having a cylindrical side wall 51 wherein vertical edges are joined by an appropriate soldered seam 52, the type conventionally used. A bottom wall 53 is also joined by the side wall 51.

To provide material for an upper edge structure at an upper rim 56 of the side wall 51, there is an initially circular band 57 of material having an inner circumferential edge 58 and an outer circumferential edge 59. Adjacent the outer circumferential edge 59 the band is bent so as to engage the upper rim 56 where it is permanently secured to the side wall by solder, brazing or other means throughout the entire circumference of the upper rim.

There is sufficient material provided in the band 57 for forming it in the broken line configuration of FIG. 8, which is also the solid line position of FIG. 9. Irrespective of the initial configuration of the band 57, the final configuration is one wherein there is an inner wall section 60 of sufficient width to form a firm bond 61 with the material of the container throughout the entire circumference of the upper rim 56 inclusive of the seam 52. In the final configuration there is adjacent the section 60 a concave arcuate section 62 of a form and character sufficient to avoid accumulation of material in the container when tilted or inverted.

The arcuate section 62 joins the adjacent edge 63 and inwardly convex camming and sealing section 64. At its opposite end the sealing section 64 joins the inner edge 65 and a relatively flat land 66. An outer rounded edge 67 of the land 66 joins an outer wall section 68 which has a width sufficient to locate an inwardly turned edge bead 69 clear of the section 60.

In the form of device of FIGS. 7, 8 and 9, a lid 15′ comprising in part a cover plate 30′ has a clamping perimeter comprising an inner band 70 and an outer band 71 separated by an end wall 72. The diameter of the inner band 70 is made large enough so that when applied to the container it will form a line seal 73 with the circumferentially innermost portion of the sealing section 64. The width of the end wall 72 is sufficient to locate the outer band 71 preferably clear of the outer wall section 68. At the free end of the outer band 71 is an outwardly turned bead 74 at a location adjacent to but clear of the edge band 69 of the outer wall section 68. The inwardly turned bead 74 can be readily pried loose from its position to remove the lid. By having beads with an open loop as shown, a snug snap-on fit can be assured without having to resort to a structure with close tolerances. Sealing material 76 may be provided on occasions.

While particular embodiments of the present invention have been shown and described, it will be obvious to those skilled in the state of the art that changes and modifications may be made without departing from the invention in its broader aspects, and therefore, the aim of its appended claims is to cover all such changes and modifications as fall within the true spirit and scope of his invention.

Having described the invention, what is claimed as new in support of Letters Patent is as follows:

1. A container and closure combination wherein the container has a cylindrical side wall having a top annular rim section and a retention structure on said rim section, said retention structure comprising an inner wall section having a cylindrical portion in bonded engagement with said rim section, said inner wall section including an annular inwardly concave section extending radially inwardly from the top edge of said rim section, a substantially rigid inwardly convex structure of arcuate form joined to said inwardly concave section and presenting an annular sealing contact line for sealing engagement with said closure, said retention structure including a relatively yieldable outer wall section separate from and overlying the cylindrical portion of said inner wall section, an annular relatively flat horizontal land between and interconnecting the outer wall section and the inwardly convex structure, said outer wall section being spaced from and in a position overlying said inner wall section, an annular free edge of said outer wall section having an inwardly curved annular bead below said inner wall section and in a position of engagement with the cylindrical side wall of the container, said closure comprising a central area and an annular substantially vertical inner band having, when in closed position on said container, an annular sealing line engagement with said inwardly convex structure, said closure including an annular substantially vertical outer band spaced from the inner band by a distance not less than the width of said land, said closure including an annular end wall connecting said inner and outer bands at a location substantially parallel to and adjacent said land, said outer band having a position overlying the outer and inner wall sections of said container, there being an outwardly curved annular bead adjacent the free edge of said outer band having a releasable engagement with said outer wall section when the closure is in said closed position on said container.

2. A container and closure combination as in claim 1 wherein the beads on respectively the outer wall section of the container and the outer band of said closure are curved hollow beads of the material respectively of said retention structure and said closure.

3. A retainer and closure combination as in claim 1 wherein the distance between said inner and outer bands of the closure exceeds the distance between the annular sealing contact line of the inwardly convex structure and the outer wall section.

4. A retainer and closure combination as in claim 1 wherein there is a sealing material between the land and the annular end wall of said closure.

5. A container having an open end and closure therefor wherein the container has a bottom wall and a cylindrical side wall having an annular outwardly convex protuberance, said rim comprising an inner wall section adjacent the open end having a radially inwardly facing annularly extending surface, said surface having a substantially rigid inwardly convex structure of arcuate form presenting an annular line of fixed dimension for sealing contact, a relatively yieldable outer wall section, said outer wall section being adjacent the open end separate from and overlying the inner wall section and at a location axially inwardly of said convex structure and terminating at a location adjacent and above said protuberance, a relatively flat horizontally extending land at the outermost ends of said wall sections and comprising a substantially rigid non-deformable and non-yielding junction between said outermost ends, a relatively flat horizontally extending intermediate wall portion spaced from said land, said land having a radially innermost annular edge coincident with an axially outermost edge of said inwardly convex structure, a radially innermost annular edge of said intermediate wall portion coincident with an axially innermost edge of said inwardly convex structure, said outer wall section being separated from the cylindrical side wall of the container where there is a variable space productive of access to the space between said inner and outer wall sections of the rim, and an annular radially inwardly facing concave corner wall section, said concave corner wall section having its inner edge joined to the outer edge of said intermediate wall section thereby forming a rigid junction between the inner wall section and the outward convex structure, there being a nonyielding annular curved portion joining the outer edge of the land and the uppermost end of said outer wall section, said closure comprising a cover plate of sheet metal consistency, an annular recess at the perimeter, said cover plate adapted to receive said annular rim, said closure having a substantially vertically extending and relatively flat circular inner band forming an inside wall of said recess and a substantially vertically extending relatively flat circumferentially continuous outer band in uniform face-to-face engagement with the outer wall section of the rim throughout the circumference, the maximum diameter of said closure at the location of the outer band being no greater than the maximum diameter of said container, there being an annular horizontal wall interconnecting adjacent captive edges of said bands, the distance between said bands being slightly less than the breadth of said annular rim whereby to create a binding and line contact sealing connection between said inner band and said annular line for sealing contact at the innermost part of said inwardly convex structure when the closure is applied to the container, the distance between said bands being no greater than the distance between opposite ends of said annular horizontal wall.

6. A container and closure as in claim 5 wherein a free end of the outer band of the closure is spaced axially from a free end of the outer wall section of said container whereby to facilitate removal of the closure.

7. A container and closure as in claim 6 wherein there is a bead formed from the material of the free end of the outer band and a bead formed from the material of the free end of the outer wall section, said beads being spaced from each other.

8. A container and closure as in claim 5 wherein there is a sealing material between said land and said bottom of the recess.

9. A container and closure as in claim 5 wherein there is an inwardly turned edge at the free end of the outer band and an annular outwardly extending stop between the inner wall section and the cylindrical side wall of the container at a location adapted to engage the free end of said outer wall section of the container and to receive the inwardly turned edge of the outer band of the closure therebeneath.

10. A container and closure as in claim 5 wherein there is a plurality of radially outwardly extending circumferentially spaced projections on the relatively flat inner band at a location inward of the annular horizontal wall at an axially inward location adjacent the inwardly convex structure, so that the projections lodge beneath and in engagement with the inwardly convex structure when the closure is applied to the container and spaced radially inwardly from a cylindrical portion of said inner wall section.

11. A container having an open end and closure therefor wherein the container has a bottom wall and a cylindrical side wall having a seamless annular rim, said rim comprising an inner wall section adjacent the open end having a radially inwardly facing annularly extending surface, said surface having a substantially rigid inwardly convex structure of arcuate form presenting an annular line of fixed dimension for sealing contact, a relatively yieldable outer wall section terminating in a free end edge of substantially the same thickness as said wall section, said outer wall section being adjacent the open end separate from and overlying the inner wall section and at a location axially inwardly of said convex structure, a relatively flat horizontally extending land at the outermost ends of said wall sections and comprising a substantially rigid non-deformable and non-yielding junction between said outermost ends, a relatively flat horizontally extending intermediate wall portion spaced from said land, said land having a radially innermost annular edge coincident with an axially outermost edge of said inwardly convex structure, a radially innermost annular edge of said intermediate wall portion coincident with an axially innermost edge of said inwardly convex structure, said outer wall section being separate from the cylindrical side wall of the container and in face-to-face position productive of access to the space between said inner and outer wall sections of the rim, and an annular radially inwardly facing concave corner wall section, said concave corner wall section having its inner edge joined to the outer edge of said intermediate wall section thereby forming a rigid junction between the inner wall section and the inwardly convex structure, there being a non-yielding annular curved portion joining the outer edge of the land and the uppermost end of said outer wall section, said closure comprising a cover plate of sheet metal consistency, an annular recess at the perimeter of said cover plate adapted to receive said annular rim of the container, said closure having a substantially vertically extending and relatively flat circular inner band forming an inside wall of said recess and a substantially vertically extending relatively flat circumferentially continuous outer band forming an outside wall of said recess, the outside wall being substantially parallel to and in uniform face-to-face engagement with the outer wall section of the rim throughout the circumference, there being an annular horizontal wall interconnecting adjacent captive edges of said bands, the space between said bands being slightly narrower than the breadth of said rim whereby to create a binding and line contact sealing connection between said inner band and said annular line for sealing contact at the innermost part of said inwardly convex structure when the closure is applied to the container, an inwardly turned edge at the free end of the outer band, and an annular outwardly extending stop at a location intermediate the inner wall section and the cylindrical side wall of the container and comprising on one side an abutment for the free end of said outer wall section of the container and on the other side comprising a retention means for the inwardly turned edge of the outer band of the closure, a plurality of radially outwardly extending circumferentially spaced projections on the relatively flat inner band at a location axially inward of the annular horizontal wall and adjacent the inwardly convex structure when the closure is in place on the container, so that the projections lodge beneath and in engagement with the inwardly convex structure, the outer wall section of the container and the outermost portion of the outer band of the closure having a diameter no greater than the maximum diameter of the cylindrical side wall.

12. A container and closure as in claim 11 wherein the container and closure when in closed assembled condition is characterized by there being throughout the circumference of the rim two thicknesses of container material and two thicknesses of closure material at both of two locations, namely, one in a transverse plane at the line of sealing contact and another in a transverse plane spaced from and parallel to said other plane at a location adjacent a free end edge of the outer wall section.

* * * * *